United States Patent [19]
Jenkner

[11] Patent Number: 5,002,108
[45] Date of Patent: Mar. 26, 1991

[54] PROCESS FOR THE EDGE PLANNING OF RECTANGULAR PLATES

[76] Inventor: Erwin Jenkner, Lindenstrasse 13, Gechingen, Fed. Rep. of Germany, D-7261

[21] Appl. No.: 413,843

[22] Filed: Sep. 28, 1989

[30] Foreign Application Priority Data

Sep. 28, 1988 [DE] Fed. Rep. of Germany ....... 3832886

[51] Int. Cl.$^5$ .............................................. B27L 11/00
[52] U.S. Cl. ........................................ 144/373; 83/56; 83/409; 83/419; 83/451; 83/468.4; 83/468.6; 83/714; 144/2 R; 144/375; 144/242 R; 144/245 R; 269/21; 409/174; 409/225; 409/226; 409/903

[58] Field of Search .............. 409/174, 219, 221, 225, 409/903, 226; 269/21; 83/451, 461, 468.6, 468.4, 56, 704, 409, 419; 144/2 R, 114 R, 373, 375, 376, 242 R, 245 R

[56] References Cited

FOREIGN PATENT DOCUMENTS 382548 5/1980 Austria .
3128917 3/1983 Fed. Rep. of Germany .
58-113028 9/1983 Japan .

Primary Examiner—W. Donald Bray
Attorney, Agent, or Firm—Dick and Harris

[57] ABSTRACT

A process for the edge-planing of the longitudinal and frontal edges of workpiece plates. A workpiece plate is advanced to a plate saw and at least one longitudinal edge is planed. The workpiece plate is then rotated and at least one frontal edge is planed by the plate saw. The workpiece plate is then rotated, aligned, and advanced toward the plate saw for sectioning.

8 Claims, 3 Drawing Sheets 5,002,108

PROCESS FOR THE EDGE PLANNING OF RECTANGULAR PLATES

BACKGROUND OF THE INVENTION

The invention relates to a process for the edge-planing of rectangular plates along a longitudinal and a frontal edge on a plate saw.

Plates of wood or of pressed wood materials for serial processing for the production of furniture are generally processed in devices which are linked with one another, in order to carry out independent processing steps, and are processed either individually or in stacks. The typically substantially rectangular plates of wood are fed through the processing equipment along a feed direction. Each of the plates has one or more longitudinal edges extending perpendicularly to the feed direction, and one or more frontal edges extending parallel to the feed direction. The rectangular plates are conveyed to the plate saw in such a manner that their longitudinal edges are presented to the cutting plane of the plate saw which has a circular cutting blade that moves up and down in the cutting plane.

It is often desirable to edge-plane each of the plates along at least one longitudinal edge and at least one frontal edge, prior to sectioning. This edge-planing is usually accomplished by the same plate saw which is used to section the plates.

A plate is first edge-planed along a longitudinal direction after it is moved forward along the feed direction. To edge-plane a frontal edge, the plate must then be rotated ninety degrees. Performing this rotation manually would be time-consuming and labor-intensive. One possibility for eliminating the manual handling of the plates would be to equip the plate saw, as disclosed in Austrian Patent 382 548, with a support table which can be swivelled by ninety degrees. A workpiece plate, which has been planed along one longitudinal side, can then be swivelled by ninety degrees through the swivelling of the table. However, to accomplish this procedure requires a plate saw specially constructed for this purpose.

It is accordingly an object of the present invention to accomplish the edge-planing of the workpiece plates, along their longitudinal and frontal edges, without any manual handling and without having to provide a special plate saw with a support table that can be swivelled by ninety degrees.

SUMMARY OF THE INVENTION

The present invention comprises a process for accomplishing the edge-planing of rectangular workpiece plates, having first and second longitudinal edges and first and second frontal edges without manual handling and further, without requiring the provision of a special plate saw having a swiveling support table.

In a preferred embodiment of the invention, the process is accomplished by advancing at least one workpiece plate, on a workpiece support surface, in an initial orientation and fully aligned position towards a plate saw. The first longitudinal edge of the workpiece plate is presented to the plate saw, and the workpiece plate is clamped down. The first longitudinal edge is trimmed with a first edge planing cut.

The workpiece plate is then withdrawn from the plate saw and rotated ninety degrees around a vertical axis.

The workpiece plate is again advanced toward the plate saw with a first frontal edge of the workpiece plate, which is substantially transverse to the first longitudinal edge, presented to the plate saw. The workpiece plate is then clamped down and cut along the first frontal edge with a second edge planing cut. The workpiece plate is again withdrawn from the plate saw, rotated around the vertical axis to its initial orientation, and advanced toward the plate saw and against an orienting device. The workpiece plate is then oriented against the orienting device to return the workpiece plate to its original fully aligned position. The workpiece plate is then clamped down and advanced toward the plate saw with the trimmed first longitudinal edge presented to the plate saw. The plate may then be sectioned by successive cuts by the plate saw.

In a preferred embodiment of the invention, the process is regulated with control means in a programmed control manner.

In an alternative embodiment of the invention, the process may further comprise presenting the second longitudinal edge of the workpiece plate to the plate saw for planing after the first longitudinal edge has been planed. The workpiece would then be clamped down and cut along the second longitudinal edge to produce a trimmed second longitudinal edge. Further, after the first frontal edge has been planed, the second frontal edge is presented to the plate saw, the workpiece plate clamped down, and cut along the second frontal edge to produce a trimmed second frontal edge.

Additionally, after the first rotation of the workpiece plate, the workpiece plate may be aligned, so that the trimmed first longitudinal edge is perpendicular with the cutting plane of the plate saw, prior to the cutting of the workpiece plate along the first frontal edge.

In order to accomplish the rotation of the workpiece plate, first the workpiece plate is positioned above a turntable having means for applying suction operably disposed upon the upper surface of the turntable. The turntable is then elevated to a suction position immediately below and in contact with the workpiece plate. The means for applying suction are activated, torsionally engaging the turntable and the workpiece plate. The turntable is then rotated. The means for applying suction are then deactivated, disengaging the workpiece plate and the turntable, and the turntable is lowered to its original position, prior to further movement of the workpiece plate. During the rotation of the workpiece plate, it may be supported on an air cushion, to reduce frictional forces between the workpiece plate and the workpiece support table.

In an alternative preferred embodiment of the invention, the process for edge-planing the longitudinal and frontal edges of a workpiece plate or a stack of workpiece plates comprises advancing at least one workpiece plate on a workpiece support surface, along a feed direction, toward the plate saw. The workpiece plate is in an initial orientation, with a first longitudinal edge presented to the plate saw. The workpiece plate is then clamped down. A first edge-planing cut produces a trimmed first longitudinal edge on said workpiece plate.

After the first edge-planing cut, the workpiece plate is withdrawn from the plate saw, elevated above the workpiece support surface, rotated ninety degrees, and lowered. The workpiece is then advanced again toward the plate saw, with a first frontal edge of the workpiece plate presented toward the plate saw. After the workpiece plate is clamped down again, a second edge-planing cut is performed.

After the second edge-planing cut, the workpiece plate is then withdrawn from the plate saw, and rotated, as described above, back to its initial orientation. The workpiece plate is again advanced toward the plate saw, and against an orienting device to return the workpiece plate to its fully aligned position. After orientation, the workpiece plate is advanced again toward the plate saw, with the trimmed longitudinal edge toward the plate saw, and the workpiece plate is longitudinally sectioned with successive cuts at the plate saw.

Due to mass inertia, the plate, upon swiveling, might misalign or move off center, and not be oriented with its trimmed longitudinal edge precisely parallel to the cutting plane of the plate saw. The advancement of the edge-planed plate longitudinal edge against the orienting device, which defines a bearing line parallel to the cutting plane of the plate saw ensures accurate execution of subsequent sectioning cuts, precisely parallel to the edge-planed longitudinal edge.

DETAILED DESCRIPTION OF THE DRAWINGS

Figure 1:
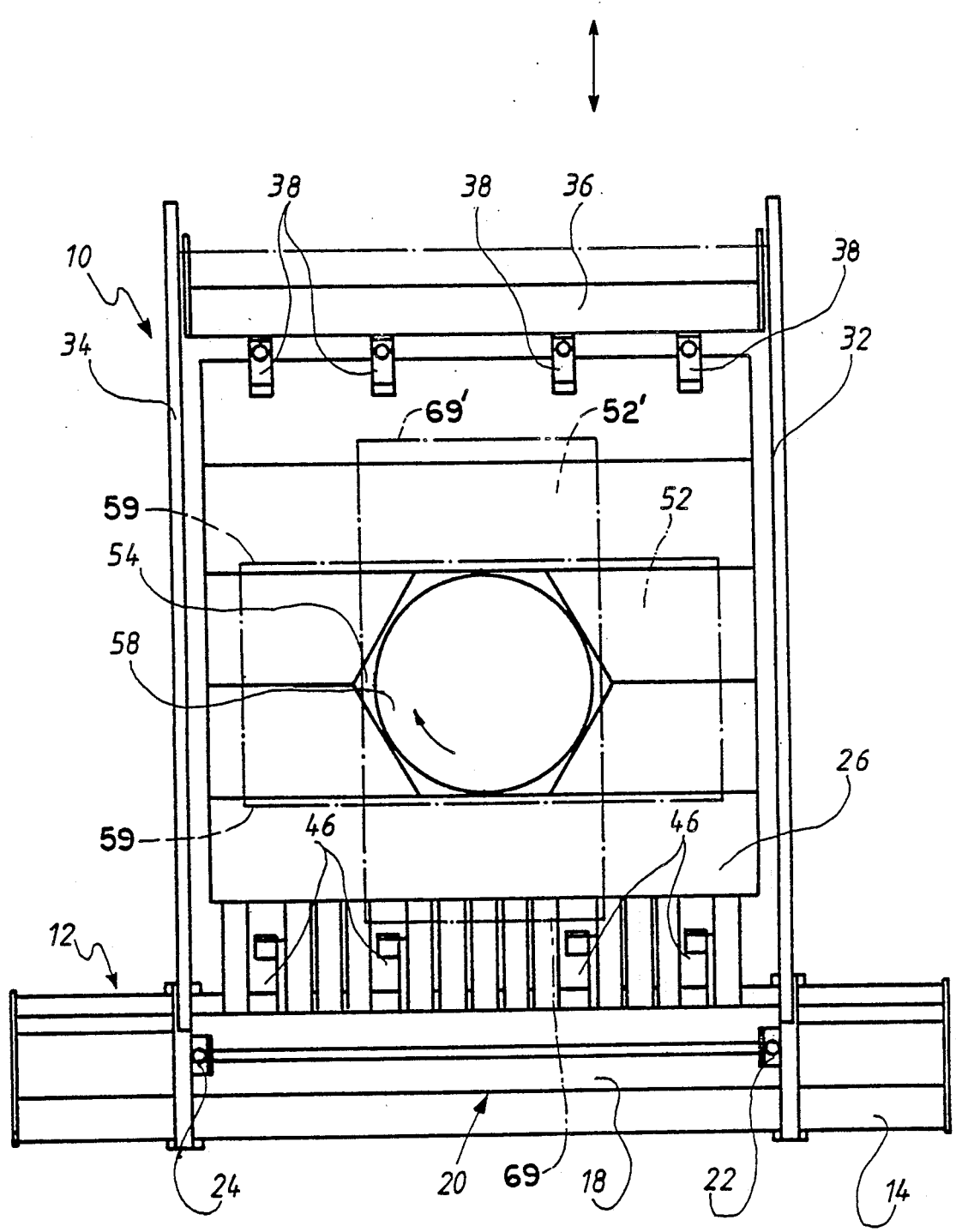
FIG. 1 is a top plan view of a workpiece advancing apparatus, in operable arrangement with a plate saw, for accomplishing the process of the present invention.

While this invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiments illustrated.

Figure 2:
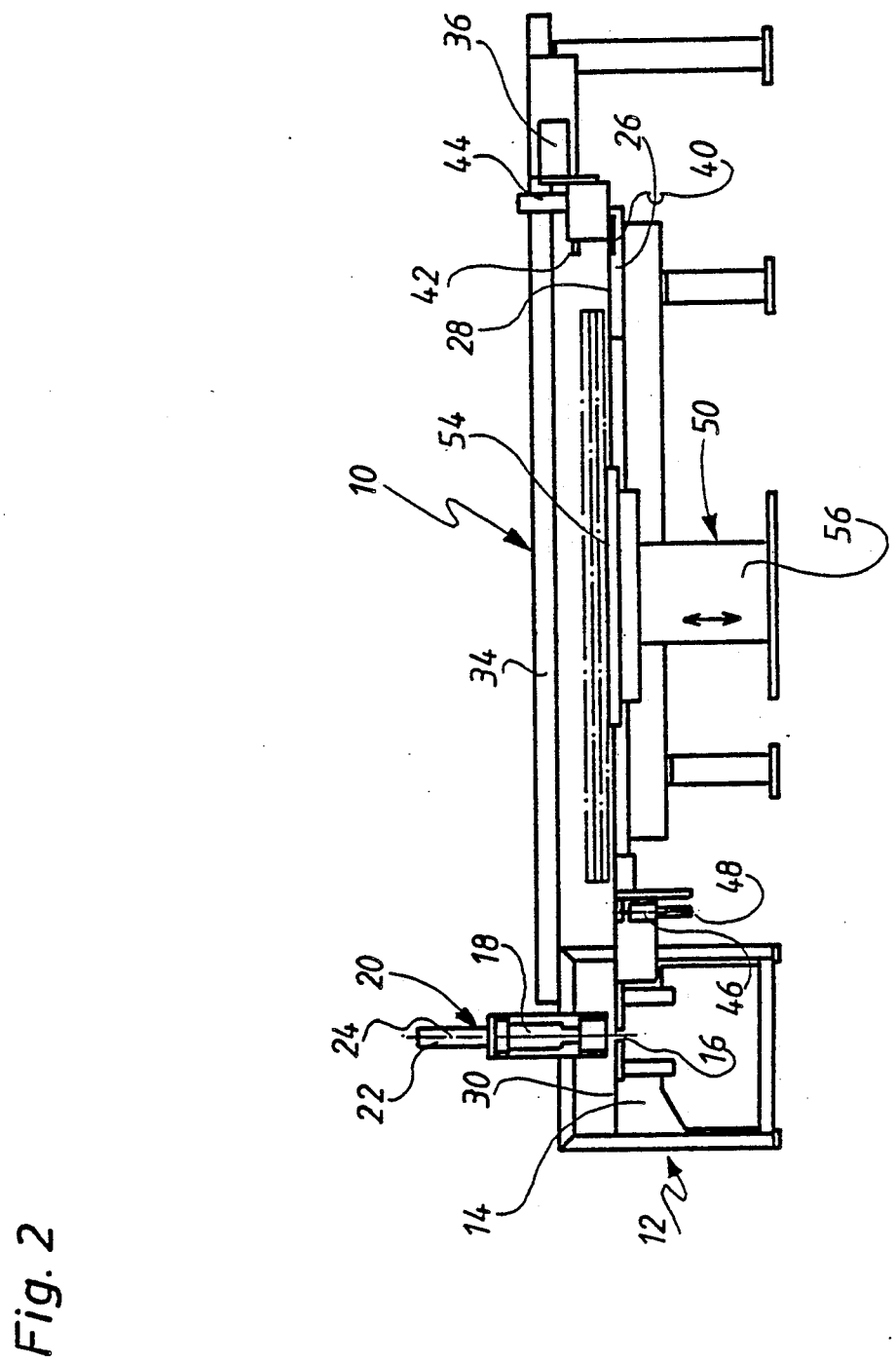
FIG. 2 is a side elevation, of the apparatus, according to FIG. 1.

A workpiece advancing device, designated as a whole by reference numeral 10, in FIG. 1, is connected with plate saw 12, for feeding workpiece plates into plate saw 12, to form a workpiece plate sectioning device. Plate saw 12 is of known construction, and requires no further elaboration for the purposes of the present invention. The plate sectioning device is equipped with machine table 14 which is penetrated by sawing aperture 16. A sawing assembly, not shown for purposes of clarity, is arranged beneath machine table 14, under sawing aperture 16. The sawing assembly, which is of known construction, will include at least one circular saw blade for the cutting of workpiece plates or stacks of plates. The circular saw blade would move upwardly out of sawing aperture 16 to cut the workpiece plates. Pressure bar 18 of workpiece clamping device 20 extends above and parallel to cutting aperture 16, as also seen in FIG. 2. Pressure bar 18 can be lowered, for example, by pneumatic cylinders 22 and 24 towards machine table 14 to clamp down workpiece plates while they are cut by the saw blade.

Workpiece advancing device 10 includes workpiece support table 26. According to a preferred embodiment of the invention, workpiece support table 26 is configured as an air cushion table, in which the workpiece plates or stacks of plates are supported above workpiece support table 26 on a cushion of air. Workpiece support surface 28 of support table 26 is arranged to be in the same horizontal plane as is workpiece support surface 30 of machine table 14.

Workpiece slide unit 36 is mounted above with workpiece support table 26. Workpiece slide unit 36 is further operably arranged to move back and forth between guide side plates 32 and 34, along the direction of the double arrow, as shown in FIG. 1. The movement of workpiece slide unit 36 will typically be program controlled by computer, in a known manner. In the present embodiment of the invention, workpiece slide unit is equipped with four clamping devices 38 located in spaced relationship across the width of workpiece slide unit 36. Each clamping device 38 is equipped with a clamping chuck (FIG. 2), the jaws of which are designated 40 and 42. Upper jaws 42 may be raised or lowered by pneumatic cylinders 44.

A number of orienting devices 46 are arranged along the transfer side of workpiece advancing device 10. The number of orienting devices 46 should, in a preferred embodiment of the invention, correspond to the number of clamping devices 38. Orienting devices 46 are positioned beneath the level of workpiece support surface 28 and are equipped with stops 48. Stops 48 are each movable upwardly past the level of workpiece support table 28, preferably by pneumatic means.

Workpiece positioning device 50 is operably arranged in the central area of workpiece support table 26. Workpiece positioning device 50 enables workpiece plates, such as workpiece plate 52, to be rotated around a vertical axis, as indicated by the curved arrow, above workpiece support table 26. In a preferred embodiment of the invention, workpiece positioning device 50 is positioned below workpiece support table 26, and includes turntable 54 which is supported by guide casing 56 in such a way that it can be raised and lowered, and motor-driven through a predetermined angle of rotation in a program-controlled manner.

Utilizing the apparatus as described, a process for the edge-planing of rectangular workpieces is accomplished as follows:

Although the following procedure may be performed in a similar manner whether a single workpiece plate or a stack of workpiece plates is to be planed, for simplicity, the planing of a single workpiece plate will be described as an example. First rectangular workpiece plate 52 is conveyed to workpiece support table 26, and clamped along a longitudinal side by clamping devices 38. Workpiece slide unit 36 then advances workpiece plate 52 onto plate saw 12 and positions plate 52 relative to the saw blade for cutting. Pressure bar 18 lowers onto and clamps down plate 52, and the first cut is made, along a first longitudinal edge 59 of the plate, opposite the edge held by clamping devices 38.

After the first cut, workpiece slide unit 36 may then be further advanced toward sawing unit 12, so that a second longitudinal edge 59' of workpiece plate 52 is presented to the plate saw. An edge-planing cut produces a trimmed second longitudinal edge, and thus a workpiece plate having a predetermined width.

Workpiece slide unit 36 is then drawn back from sawing unit 12 to a position in which workpiece plate 52 is above device 50. Workpiece slide unit 36, or more particularly clamps 38, releases workpiece plate 52 and withdraws as turntable 54 elevates and comes into contact with workpiece plate 52 and, via vacuum plate 58, becomes torsionally engaged with workpiece plate 52. Turntable 54 then rotates ninety degrees, in a program-controlled manner. The vacuum is cut off, and turntable 54 becomes torsionally disengaged with workpiece plate 52 and is lowered. The rotated position of workpiece plate 52 is indicated as rotated plate 52'.

Turntable 54 may be constructed so that each time it is activated to rotate a workpiece, once it has elevated to and engaged workpiece plate 52, turntable 54 may further raise workpiece plate or plates 52 above the surface of workpiece support table 25 prior to rotation, and then lower workpiece plate(s) 52 after rotation.

After the just-described rotation, workpiece slide unit 36 advances and clamping units 38 again grasp rotated plate 52' and move it toward sawing unit 12. Once positioned and clamped by pressure bar 18, a first frontal edge 69 of rotated plate 52' may be edge-planed by the plate saw.

After the edge-planing of first frontal edge 69 has been accomplished, workpiece slide unit 36 may advance along the feed direction beyond sawing unit 12, and then withdraw to present second frontal edge 69' of rotated plate 52' to sawing unit 12. Alternatively, as will be described in a further embodiment, rotated plate 52' may be further rotated to present second frontal edge 69' to the plate saw. A further edge-planing cut yields a second trimmed frontal edge 69'; and a rotated plate 52' with a predetermined length. Rotated plate 52' is then drawn back by workpiece slide unit 36, released by clamps 38, and rotated by turntable 54, in the manner previously described, back to its original orientation.

However, due to the effects of mass inertia which may result during the rotations of workpiece 52, workpiece 52 may become slightly misaligned relative to the device 50, and so the longitudinal trimmed edges may not be precisely parallel to the plane of plate saw 12, and in particular cutting aperture 16. Stops 48 of orienting devices 46 are then raised and as workpiece plate 52 is again pushed by workpiece slide unit 36, the edge-planed longitudinal edge of workpiece plate 52 is brought up against stops 48, and to its original fully aligned position. Workpiece plate 52 is then again clamped by clamps 38 and ready for further operations, such as, for example, a program-controlled longitudinal sectioning.

Figure 3:
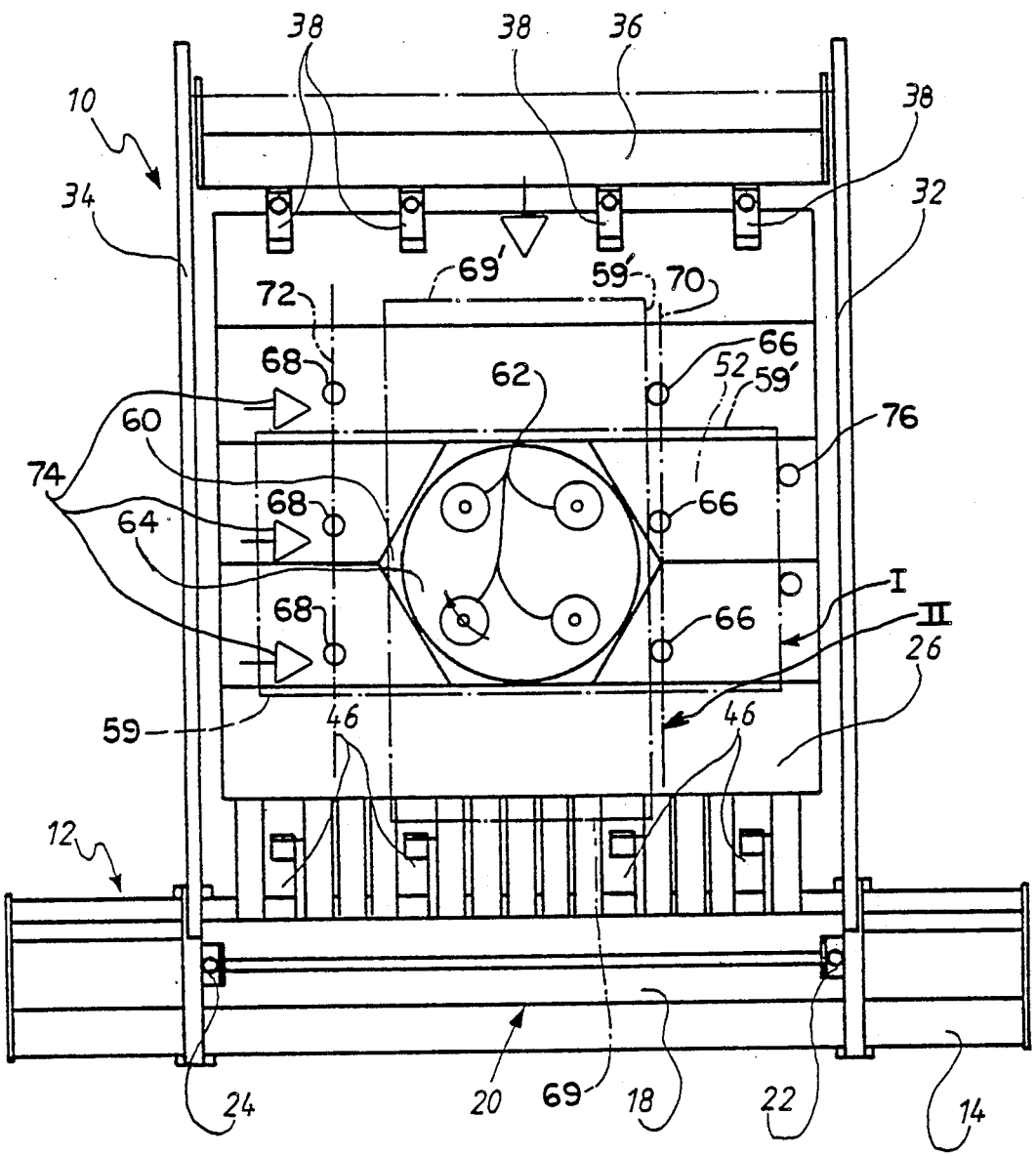
FIG. 3 is a top plan view of an alternative apparatus configuration for accomplishing an alternative embodiment of the process of the present invention.

An apparatus for accomplishing the process of the present invention is shown in FIG. 3, and identical parts as shown in FIGS. 1 and 2, are identified by the same reference numbers. Similar to the process described with respect to FIGS. 1 and 2, the following procedure may be performed in a similar manner whether a single workpiece plate or a stack of workpiece plates is to be planed; however, for simplicity, the planing of a single workpiece plate will be described as an example.

Apparatus 10 has a workpiece positioning device 60 which includes suction cups 62 that are connected to a vacuum source. Suction cups 62 are disposed on a turntable 64 which can be turned around a vertical axis by ninety degrees, in a similar fashion to device 50 which is shown in FIG. 1. When turntable 64 is inactive, it is positioned below the surface of workpiece support table 26. Turntable 64 is lifted vertically, but only to the extent that suction cups 62 can be attached to and apply suction to the bottom side of workpiece plate 52. During turning, workpiece plate 52 is not lifted above its plane of support, whether directly on the surface of workpiece support table 26, on or a supportive air cushion provided to overcome the frictional force between workpiece plate 52 and workpiece support table 26.

Within workpiece support table 26, as seen in FIG. 3, sets of retainers 66 and 68, are arranged along the feed direction, with each set being in a line indicated by phantom lines 70 and 72, respectively, that are exactly perpendicular to the cutting plane of the plate saw. Retainers 66 and 68 are preferably arranged on both sides of workpiece positioning device 60, and are each operably associated with an pushing device, indicated by arrows 74. For clarity, only one pushing device 74 is indicated in FIG. 3.

Like orienting devices 46, retainers 66 and 68 are adjustable from a submerged position below the contact plane of the workpiece plate to an elevated position above the surface of workpiece support table 26. Retainers 66 and 68, respectively, serve to align a the longitudinal edges of trimmed workpiece plate 52 or a stack of plates 52 so that the trimmed longitudinal edges are exactly perpendicularly aligned with the saw.

Another group of retainers 76 is arranged in a line indicated by phantom line 78 that is exactly perpendicular to the cutting plane of the plate saw, extending along the feed direction between the group of retainers 66 and guide side plate 32; this group of retainers 76 can likewise be elevated upward above the level of workpiece support table 26 from below.

Retainers 66 and 68, as well as retainers 76 and 78, are advantageously configured to be both adjustable and lockable transversely to the feed direction, relative to the support surface of workpiece support table 26.

Utilizing the foregoing arrangement shown in FIG. 3, a process for edge-planing rectangular plates can be performed as follows:

As an example, assume that a single workpiece plate 52 has been positioned for cutting on workpiece support table 26, so that first longitudinal edge 59 is aligned with the cutting plane of the plate saw. This initial position is indicated by I. Workpiece slide unit 36 then activates and positions workpiece plate 52 into a planing position below pressure bar 18. After performing a first planing cut along first longitudinal edge 59, workpiece plate 52 is again moved forward along the feed direction until it reaches a position where a planing cut of second longitudinal edge 59' can be performed, in order to cut the workpiece plate to a predetermined width.

Next, workpiece plate 52 is pulled back by workpiece slide unit 36 until it rests above workpiece positioning device 60. Turntable 64 is raised, suction cups 62 are connected to a vacuum source and attach to workpiece plate 52, creating a torsional connection between workpiece plate 52 and turntable 64. Turntable 64 is then rotated ninety degrees, in the direction of the arrow. This position is indicated by II. The vacuum in suction cups 62 is cut off, and turntable 64 is lowered. Retainers 66 are then raised from beneath workpiece support table 26. The pushing device (indicated by arrows 74) activates and aligns second longitudinal edge 59' with retainers 66, so that longitudinal edges 59 and 59' are exactly perpendicularly aligned with the cutting plane of the plate saw. Workpiece slide unit 36 again moves workpiece plate 52 along the feed direction and positions it with first frontal edge 69 under pressure bar 18, for planing of first frontal edge 69. After a planing cut, workpiece plate 52 is withdrawn by workpiece slide unit 36 to its position over workpiece positioning device 60. Workpiece 52 may then be rotated twice in succession by ninety degrees by turntable 64, in the manner previously described, for a total rotation of one hundred eighty degrees, to present second frontal edge 69' to the plate saw for planing. Workpiece plate 52 may then be further aligned by retainers 66 or 68, prior to the execution of a planing cut to trim second frontal edge 69'.

When at least one frontal edge of workpiece plate 52 has been trimmed, or when both frontal edges have been trimmed, workpiece plate 52 is again rotated, so that it may subsequently be cut longitudinally, in the manner described with respect to FIGS. 1 and 2. Retainers 76 and 78 are provided to align workpiece plate 52, after the planing of the frontal edge or edges, to assure that longitudinal edges 59 and 59' are parallel to the cutting plane of the plate saw prior to sectioning. Alternatively, workpiece plate 52 may also be cut latitudinally after the frontal edge or edges have been trimmed. Retainers 66 or 68 would be used, as previously described to align frontal edges parallel to the plate saw, for latitudinal sectioning.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. A process for the edge-planing of one or more rectangular workpiece plates, which each have first and second longitudinal edges and first and second frontal edges, along at least said first longitudinal and frontal edges thereof, said process comprising the steps of:
   (a) advancing at least one workpiece plate, on a workpiece support surface, in an initial orientation and fully aligned position towards a plate saw with said first longitudinal edge of said workpiece plate presented to said plate saw, clamping down said workpiece plate and cutting said first longitudinal edge with an edge-planing cut to produce a trimmed first longitudinal edge;
   (b) withdrawing said workpiece plate from said plate saw and rotating said workpiece plate ninety degrees around a vertical axis;
   (c) advancing said workpiece plate again towards said plate saw, with said first frontal edge of said workpiece plate, that is substantially transverse to said first longitudinal edge, presented to said plate saw, clamping down said workpiece plate and cutting said workpiece plate along said first frontal edge with another edge-planing cut;
   (d) withdrawing said workpiece plate from said plate saw, rotating said workpiece plate around said vertical axis to its initial orientation, and advancing said workpiece plate toward said plate saw and against an orienting device;
   (e) orienting said workpiece plate against said orienting device to return said workpiece plate to its original fully aligned position, and then advancing said workpiece plate towards said plate saw with said trimmed first longitudinal edge presented to said plate saw, and sectioning said workpiece plates by successive cuts by said plate saw.

2. The process according to claim 1, wherein said process further comprises the following steps:
   (a) presenting said second longitudinal edge of at least one of said workpiece plate to said plate saw for planing after said first longitudinal edge has been planed, clamping down said at least one workpiece plate, and cutting said workpiece plate with an edge-planing cut to produce a trimmed second longitudinal edge;
   (b) after said first frontal edge has been planed, presenting said second frontal edge to said plate saw, clamping down said at least one workpiece plate, and cutting said workpiece plate with an edge-planing cut to produce a trimmed second frontal edge.

3. The process according to claim 1 wherein said process further comprises the following steps:
   (a) aligning said workpiece plate, after said first rotation of said workpiece plate, so that said trimmed first longitudinal edge is perpendicular with a cutting plane of said plate saw, prior to said cutting of said workpiece plate along said first frontal edge.

4. The process according to claim 1 wherein each of said rotating steps further comprises the following steps:
   (a) positioning said workpiece plate above a turntable having a means for applying suction including at least one suction cup arranged on an upper surface of said turntable;
   (b) elevating said turntable to a suction position immediately below and in contact with said workpiece plate;
   (c) activating said means for applying suction, and thereby torsionally engaging said turntable and said workpiece plate;
   (d) rotating said turntable and said workpiece plate;
   (e) deactivating said means for applying suction, disengaging said workpiece plate and said turntable;
   (f) lowering said turntable prior to further movement of said workpiece plate.

5. The process according to claim 1 wherein said process further comprises the following steps:
   (a) supporting said workpiece plate on an air cushion during said rotations of said workpiece plate.

6. The invention according to claim 1 wherein said step of orienting said workpiece plate against said orienting device further comprises the following steps:
   (a) elevating at least one means for aligning said first longitudinal edge of said workpiece plate parallel to said plate saw, from a position below said surface of said workpiece support table to a position above said workpiece support table;
   (b) advancing said workpiece plate against said at least one means for aligning said first longitudinal edge of said workpiece plate parallel to said plate saw;
   (c) lowering said at least one means for aligning said first longitudinal edge of said workpiece plate parallel to said plate saw, back to its initial position below said surface of said surface of said workpiece support table.

7. A process for the edge-planing of rectangular workpiece plates, which each have first and second longitudinal edges and first and second frontal edges, along said longitudinal and frontal edges thereof, said process comprising the steps of:
   (a) advancing at least one workpiece plate, on a workpiece support surface, in an initial orientation and fully aligned position towards a plate saw with a longitudinal edge of said workpiece plate presented to said plate saw, clamping down said workpiece plate and cutting said longitudinal edge with a first edge-planing cut to produce a trimmed longitudinal edge;

(b) withdrawing said workpiece plate from said plate saw, elevating said workpiece plate above said workpiece support surface and rotating said workpiece plate ninety degrees around a vertical axis and lowering said workpiece plate to said workpiece support surface;

(c) advancing said workpiece plate again towards said plate saw, with a frontal edge of said workpiece plate that is substantially transverse to said longitudinal edge presented to said plate saw, clamping down said workpiece plate and cutting said plate along said frontal edge with a second edge-planing cut;

(d) withdrawing said workpiece plate from said plate saw, elevating said workpiece plate above said workpiece support surface and rotating said workpiece plate back ninety degrees around said vertical axis to its initial orientation and lowering said workpiece plate to said workpiece support surface, and advancing said workpiece plate toward said plate saw and against an orienting device;

(e) orienting said workpiece plate against said orienting device to return said workpiece plate to its original fully aligned position, and then advancing said workpiece plate towards said plate saw with said trimmed longitudinal edge presented to said plate saw, and sectioning said workpiece plate by successive cuts by said plate saw.

8. The process according to claims 1, 2, 3, 4, 5, 6, or 7, for the edge-planing of one or more rectangular workpiece plates, which each have first and second longitudinal edges and first and second frontal edges, wherein said process further comprises the step of regulating said steps of said process with control means in a program controlled manner.

* * * * *

UNITED STATES PATENT AND TRADEMARK OFFICE
CERTIFICATE OF CORRECTION

PATENT NO. : 5,002,108

DATED : March 26, 1991

INVENTOR(S) : Erwin Jenkner

It is certified that error appears in the above-identified patent and that said Letters Patent is hereby corrected as shown below:

Col. 6, Line 15      Delete "a the" and instead insert --the--

Col. 6, Line 48      Delete "attach" and instead insert --attached--

Signed and Sealed this

Eighteenth Day of August, 1992

Attest:

DOUGLAS B. COMER

Attesting Officer      Acting Commissioner of Patents and Trademarks